Figure 1:
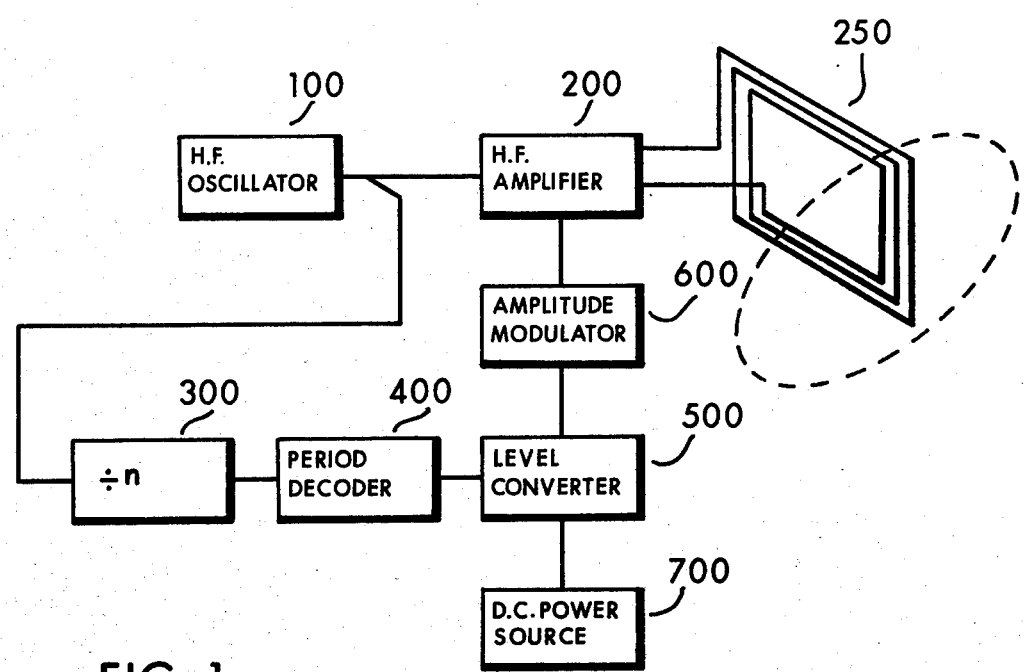

United States Patent [19]

Weber

[11] 4,137,500

[45] Jan. 30, 1979

[54] FREQUENCY DEPENDENT AMPLITUDE MODULATED EXCITER APPARATUS

[76] Inventor: Harold J. Weber, 20 Whitney Dr., Sherborn, Mass. 01770

[21] Appl. No.: 748,373

[22] Filed: Dec. 7, 1976

[51] Int. Cl.² .............................................. H04B 1/04
[52] U.S. Cl. ................................ 325/141; 325/38 A; 325/164; 328/30; 328/157; 328/158; 340/355
[58] Field of Search ............... 325/38 A, 64, 101, 141, 325/152, 164, 166, 182, 28; 340/169, 172, 355; 332/31 T; 179/82; 328/28-30, 157, 158

[56] References Cited

U.S. PATENT DOCUMENTS

| 3,299,356 | 1/1967 | Bornhorst et al. | 325/164 |
| 3,432,773 | 3/1969 | Land et al. | 332/31 T |
| 3,549,818 | 12/1970 | Turner | 179/82 |
| 3,559,067 | 1/1971 | Genest et al. | 325/38 A |
| 3,579,117 | 5/1971 | Norris et al. | 328/30 |

Primary Examiner—Robert L. Richardson
Assistant Examiner—Marc E. Bookbinder

[57] ABSTRACT

My invention relates to the hookup of electrical and mechanical devices for use in a frequency dependent amplitude modulated exciter apparatus. My invention provides a higher first frequency alternating current source of electromagnetic power which is methodically modulated in amplitude at numerous lower order concurrent second frequency pulse train rates wherein each particular second frequency impulse rate causes an orderly succession of singular bursts of said first frequency energy wherein the duration of each burst represents less than one total cycle period of the highest of the lower order second frequency pulse train rates whereupon the magnitude of each said singular burst of said first frequency is at an absolute amplitude which is greatest for the less frequently occurring second frequency pulse train rates and least amplitude for the most frequently occurring second frequency rates.

My invention has particular application as a source of first frequency power which is recovered by a detector apparatus arranged so as to respond to the individual amplitude steps of said second frequency pulse train imposed on said first frequency and dependent on the instantaneous amplitudes of the said second frequency steps. Such a level responsive detector will recover a component second frequency the rate of which is dependent on the composite first frequency amplitude.

12 Claims, 8 Drawing Figures

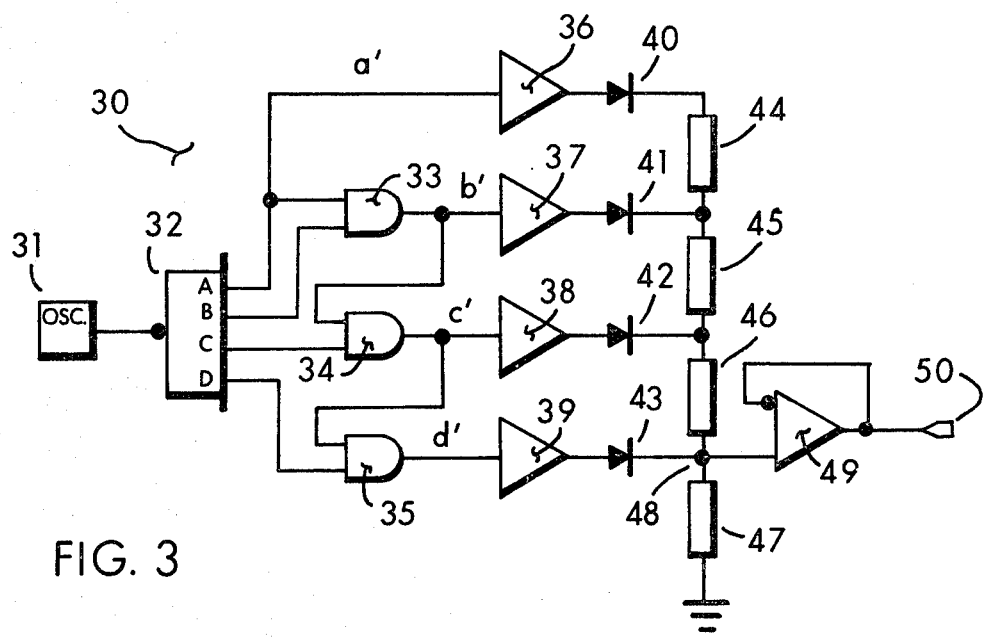
FIG. 3
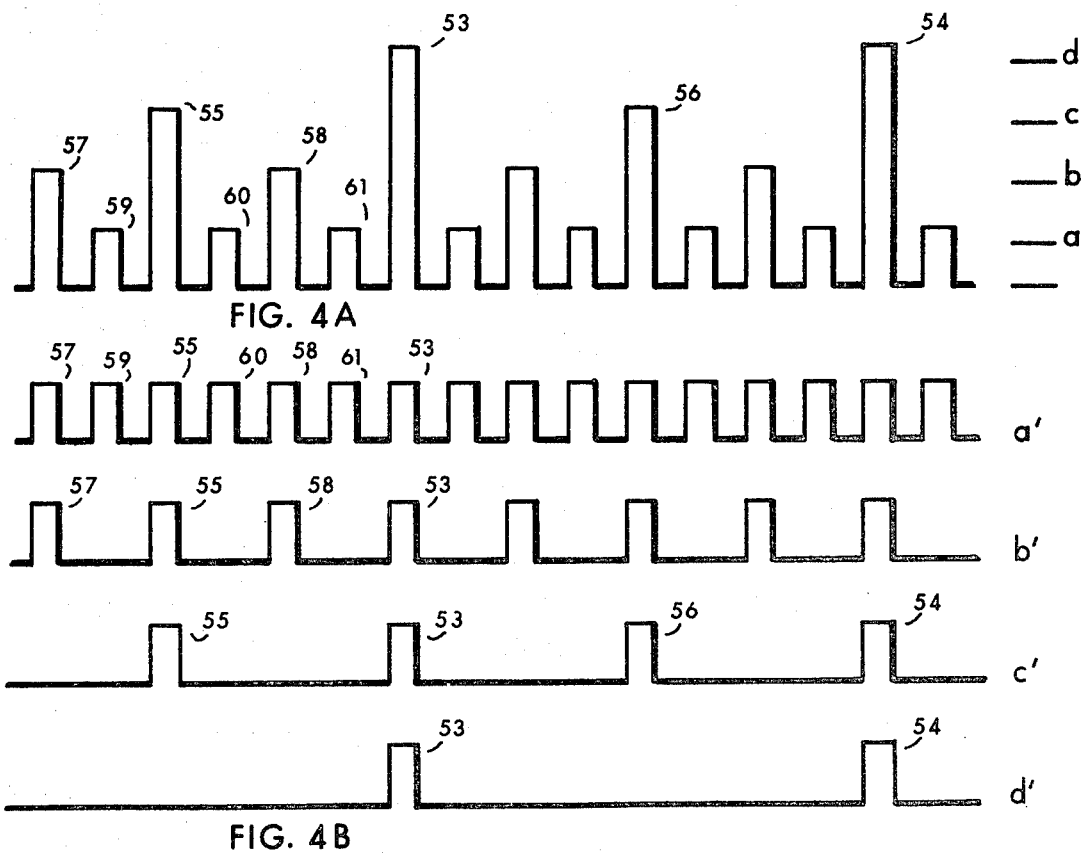
FIG. 4A
FIG. 4B

FREQUENCY DEPENDENT AMPLITUDE MODULATED EXCITER APPARATUS

SUMMARY

My invention relates to the hookup of electrical and mechanical devices for use in an frequency dependent amplitude modulated exciter apparatus and more particularly, to a portable device which will, in conjunction with a suitable receptor apparatus, provide an audio frequency indication to an operator, from the receptor which indicates by the pitch therefrom, of the relative field strength intensity picked up directly or indirectly from my new invention apparatus. In particular my invention has distinct application as the excitation apparatus for use in signal tracking apparatus such as hidden structure tracing systems.

In prior art methods, excitation means providing a relatively constant alternating current induction field level are commonly employed. Subseqently the relative level of this field as intercepted by an inducer arranged as an exploring probe is amplified in a receptor device, rectified and used to indirectly control an audio frequency voltage controlled oscillator. The result is an audio frequency which is pitch modulated in some proportion to the relative level of the intercepted excitation apparatus field.

My new invention provides a composite multiple tone modulation of the excitation apparatus which may be converted by simple level responsive receptor means into an audio frequency output the pitch or rate of which is indicative of the relative field signal strength.

My new invention is superior to prior teachings in that the excitation field contains the pitch modulation intelligence directly in the induced signal thereby relieving the need for signal level to tone conversion in the receptor apparatus. This point of my new invention simplifies and makes more operator skill independent the requirements for the receptor apparatus.

REFERENCE TO DRAWINGS

Figure 2:
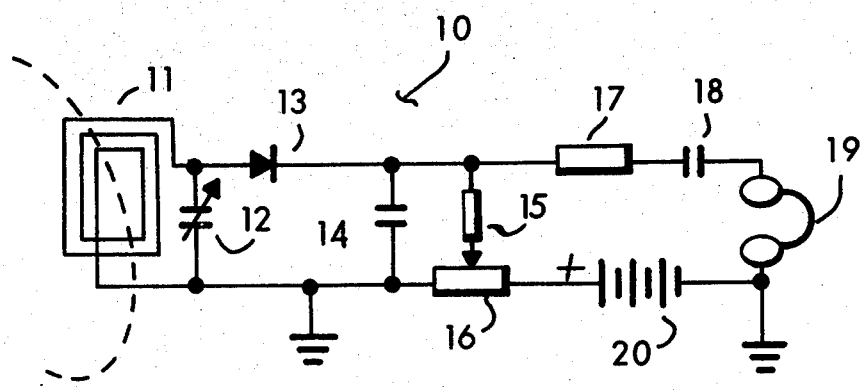
Figure 5:
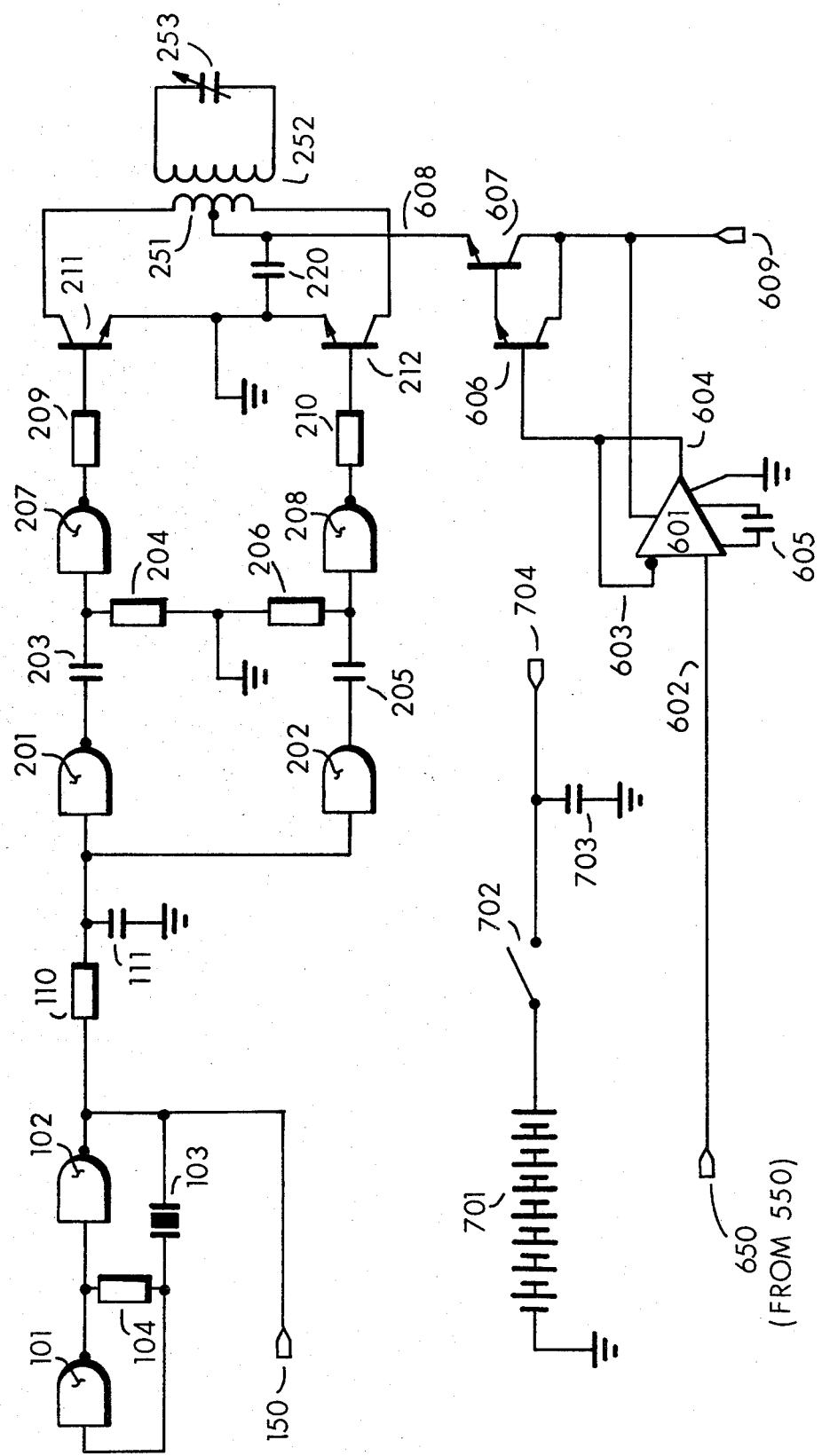
Figure 6:
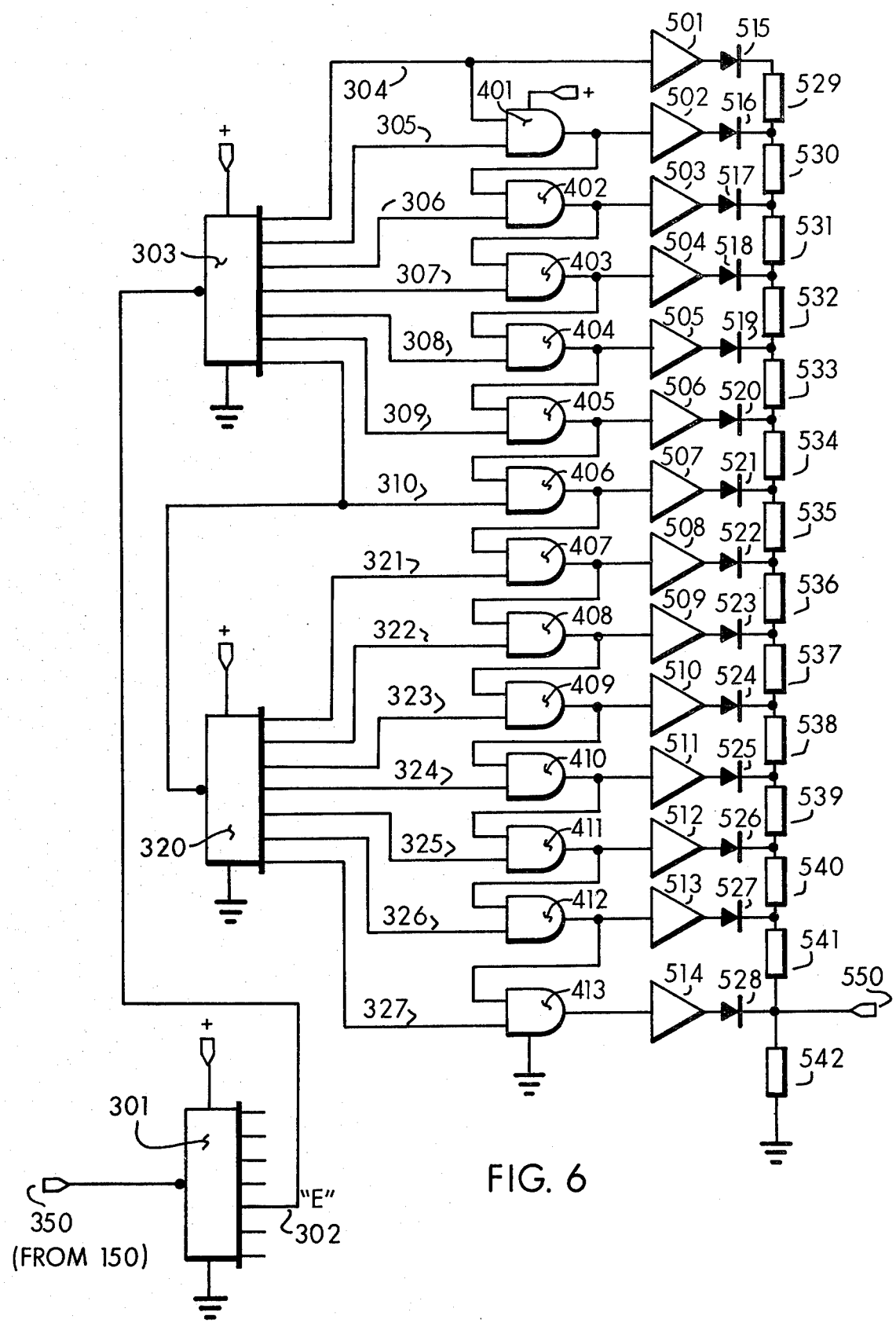

My disclosure includes five sheets of drawings containing eight figures as:

FIG. 1 — An overall block diagram showing how the major subsections interconnect, FIG. 2 — A simple receptor means for demodulating the unique exciter signal, FIG. 3 — Schematic showing elemental four level amplitude converter, FIG. 4A — Waveform representation of four level composite signal, FIG. 4B — Waveform representations of individual components of composite four level signal, FIG. 5 — Schematic for representation prime frequency oscillator and amplifier, FIG. 6 — Schematic for representative period decoder and level converter method.

Figure 7:
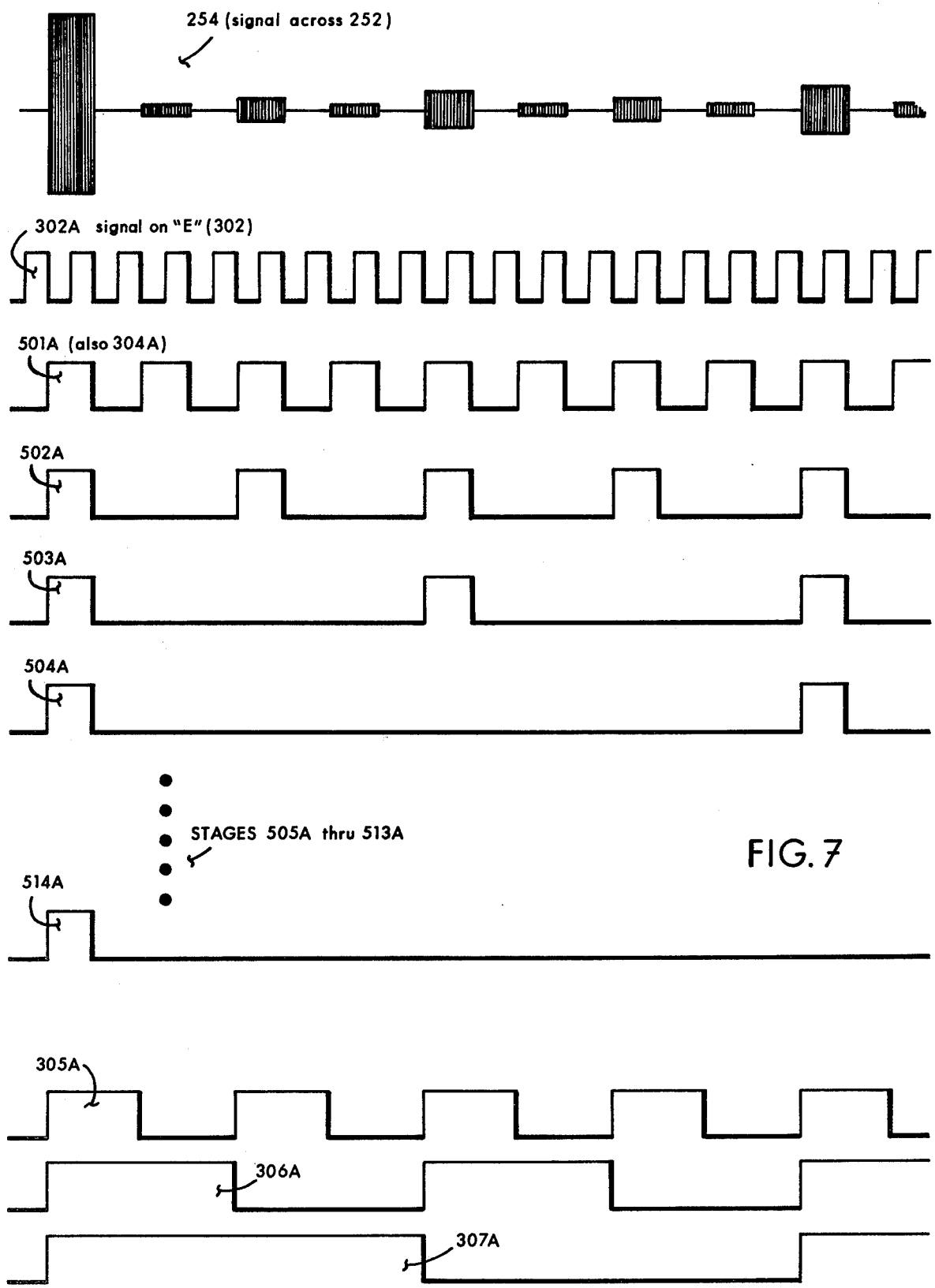

FIG. 7 — Waveform representation for plural level composite signal and individual signal component impulse timing.

SPECIFICATION

FIG. 1 is an overall block diagram showing a high prime frequency oscillator 100 driving a modulated high prime frequency amplifier 200 which excites the inductive loop 250.

The prime high frequency oscillator 100 also drives a "divide by n" circuit 300, the high first frequency output of which is processed by a period decoder 400 to be converted into a period dependent composite signal of various amplitudes by the level converter 500. The composite multi-amplitude waveform then modulates the amplifier 200 by means of the amplitude modulator 600. A direct current source of power 700 energizes all the power requiring circuits.

FIG. 2 is the schematic for a simple demodulator for the waveform of a signal such as would be generated by the exciter apparatus portrayed in FIG. 1. In FIG. 2 an inducer 11 picks up a portion of the field lines directly or indirectly emanating from the exciter. In conjunction with capacitor 12, the inducer is made to be self resonant at the frequency which is emitted by the exciter thereby increasing the inducer gain and performance. The signal developed in the said resonant inducer as a voltage is rectified by unilateral device 13 and the high frequency component is filtered by capacitor 14. The point of rectification of the rectifier 13 is preestablished by tapping a voltage from a potentiometer 16 one end of which is grounded, the other end of which is connected to a battery positive source 20. As the arm of the potentiometer 16 is brought away from ground, the cathode of the rectifying device 13 is made more positive than the anode through the path completed by isolation resistor 15. With the diode 13 cathode more positive than the anode, rectification is inhibited by phenomenon referred to as reverse bias or back bias. Such back or antirectification bias causes the diode 13 to not respond to incoming inducer signals until the said inducer signals exceed in amplitude the level of this back bias. Thus by adjusting the antirectification bias level with potentiometer 16, the point where rectification can occur is determined by the operator. Since our composite signal from the exciter shown in FIG. 1 is methodically various in amplitude, the simple demodulator in FIG. 2 will respond only to those signal amplitudes exceeding this antirectification level. The resultant output is shown to feed to headpones 19 through direct current blocking capacitor 18 and a leveling resistor 17.

The purpose of the simple demodulator shown in FIG. 2 is for purposes of test and adjustment of the exciter represented in FIG. 1.

FIG. 3 shows a demonstrative circuit for developing a four level composite frequency dependent amplitude modulated signal. Shown as four stages, the method readily can be extended to "n" stages or levels of elaboration. In practice for audio frequency period modulation, extension beyond twelve to fourteen stages is of diminishing value.

FIG. 4A shows the resultant composite waveform generated by my level converter in FIG. 3, while FIG. 4B shows the individual waveforms comprising the inputs to the level converter stages 36 through 39 from the period decoder stages 33, 34, and 35 in FIG. 3. FIGS. 4A and 4B will be employed in the description of the operation of the circuits shown in FIG. 3.

An oscillator, clock, or other generative means 31 provides a source of high first frequency which is double that of the highest desired composite waveform frequency a'. This first frequency 31 drives a four stage binary counter of divider circuit 32 which results in four pulse train outputs A, B, C, and D. Operation is such that the frequency of A is onehalf the first frequency or clock 31; B is one half A; C is one half B; and D is one half C. These subsequent pulse train frequencies are referred to, in plurality, as second, or lower, frequencies being derived from the first or higher frequency and as such are all concurrently operative with harmonic relationship. Combinative circuitry consisting of two input AND logic gates 33, 34 and 35 serve to provide three unique control signal outputs b', c', and d' in addition to the a' output directly derived from the A output on the counter 32. The AND gate outputs are unique in that only once during every sixteen first frequency cycles can an output occur at the output of gate 35, and then the duration will be for only one-half the period of the A output from counter 32, or effectively the period of a'. Although in the form I herein describe this relationship does indeed occur, the only constraint on other methods for generating the output waveform is that the control signal period for any rate has a duration somewhat less than the cycle period of the highest said various control signals. Likewise only one output from gate 34 can occur for every eight first frequency cycles, and only one output can occur from gate 33 for every four first frequency cycles. This action is true because for in the example of the d' output from gate 35 there is only one condition for every sixteen first frequency cycle inputs to counter 32 that all four outputs A, B, C and D will be high or logic "1", the condition that

| | |
|---|---|
| A = a', | thus a' = 1 |
| A B = b', | thus b' = 1 |
| b' C = c', | thus c' = 1 |
| c' D = d', | thus d' = 1 | and if either $\bar{A}, \bar{B}, \bar{C},$ or $\bar{D} = 0$ occurs, the output will be $\bar{a'} = 0.$ The following timing diagram shows this relationship more clearly.

| CK | A | B | C | D | a'=A | b'=AB | c'=ABC | d'=ABCD | Level |
|---|---|---|---|---|---|---|---|---|---|
| 0 | 0 | 0 | 0 | 0 | 0 | 0 | 0 | 0 | 0 |
| 1 | 1 | 0 | 0 | 0 | 1 | 0 | 0 | 0 | 1 |
| 2 | 0 | 1 | 0 | 0 | 0 | 0 | 0 | 0 | 0 |
| 3 | 1 | 1 | 0 | 0 | 1 | 1 | 0 | 0 | 2 |
| 4 | 0 | 0 | 1 | 0 | 0 | 0 | 0 | 0 | 0 |
| 5 | 1 | 0 | 1 | 0 | 1 | 0 | 0 | 0 | 1 |
| 6 | 0 | 1 | 1 | 0 | 0 | 0 | 0 | 0 | 0 |
| 7 | 1 | 1 | 1 | 0 | 1 | 1 | 1 | 0 | 3 |
| 8 | 0 | 0 | 0 | 1 | 0 | 0 | 0 | 0 | 0 |
| 9 | 1 | 0 | 0 | 1 | 1 | 0 | 0 | 0 | 1 |
| 10 | 0 | 1 | 0 | 1 | 0 | 0 | 0 | 0 | 0 |
| 11 | 1 | 1 | 0 | 1 | 1 | 1 | 0 | 0 | 2 |
| 12 | 0 | 0 | 1 | 1 | 0 | 0 | 0 | 0 | 0 |
| 13 | 1 | 0 | 1 | 1 | 1 | 0 | 0 | 0 | 1 |
| 14 | 0 | 1 | 1 | 1 | 0 | 0 | 0 | 0 | 0 |
| 15 | 1 | 1 | 1 | 1 | 1 | 1 | 1 | 1 | 4 |

The outputs a', b', c' and d' then serve to drive buffers 36, 37, 38 and 39 respectively. The output of the said buffers couple to a resistor network 44, 45, 46 and 47 through steering diodes 40, 41, 42 and 43. For purpose of this discussion, if resistor 47 = R, and:

resistor 46 = 0.333 R,
resistor 45 = 0.667 R,
resistor 44 = 2.0 R the result will be that at the summing point 48, the levels for different period bursts will be, where level equals E:

d' = 1.0 E
c' = 0.75 E
b' = 0.50 E
a' = 0.25 E, or in effect the amplitude of a' will be 25% that of d'. This example can be extended by those skilled in the art of network designs to cause a', b', c', d' to have non-linear relationship. The value E is supplied by the respective buffers 36, 37, 38 and 39 through the respective blocking diodes 40, 41, 42 and 43.

A linear summing point isolation amplifier 49 shown here as a unity gain voltage follower or buffer drives the output 50 with the level on the summing junction 48. This output 50 serves as the terminal means for the patterned pulse train signal generated by the circuit means comprising this particular exampled form of my invention and as such may serve to drive external receptor means through cooperative interconnective means, as for example, direct wired connection or an inducer.

Reverting to FIG. 2 in conjunction with FIGS. 4A and 4B shows how the demodulator in FIG. 2 can recover a "tone" of particular pulse rates from the composite signal in FIG. 4A the rate of which is relative to amplitude. If the demodulator is adjusted to recover only levels equal to or greater than d in FIG. 4A, only pulses 53 and 54 will be demodulated resulting in the pulse rate show as d' in FIG. 4B. Likewise, threshold adjustment of the demodulator to recover levels equal to or greater than c, b, or a will result in respective output pulse rates shown as c', b', and a' respectively. The relationship of the signals in FIG. 4A and 4B can be correlated by pulses 53 through 61 as shown. If the a' pulse rate or frequency, for purpose of simple illustration, be a value of 4,000 hertz, then b' will be 2000 hertz, c' will be 1000 hertz, and d' will be 500 hertz, whilst the pulse width of any given pulse will be only 125 microseconds or in effect the cycle period of the 8,000 hertz clock frequency.

The preceding discussion describes the novelty basis for the development of my invention, while the following discussion describes a modeled preferred embodiment expanding upon this novelty. In my preferred embodiment shown in FIG. 5, a radio frequency oscillator consisting of a piezoelectric quartz crystal or similiar resonant device 103 in conjunction with inverting gain devices 101 and 102 together with resistor 104 provide a form of stabilized multivibrator oscillator operating at a high prime frequency which I chose in my model to be about 440 kilohertz. This particular type of oscillator works well with the C-MOS class of logic components typified by the 4011AE in my model. With other families of logic components such as TTL, DTL, RTL, and so on, a different oscillator hookup may be more suitable as long as it produces the necessary output. This oscillator action results not only in an output at juncture 150 but also a delayed signal at the inputs of inverter 201 and buffer 202 through integration network resistor 110 and capacitor 111. The outputs of devices 201 and 202 are respectively coupled to buffers 207 and 208 through differentiating networks consisting of capacitors 203 and 205 together with resistors 204 and 206. The values of the differentiating components are selected as to provide a shortened pulse signal to be developed at the output of buffers 207 and 208. This shortened pulse serves to drive transistors 211 and 212 through base drive resistors 209 and 210. The collectors of the transistors 211 and 212 serve to push-pull drive the primary 251 of the output loop 252 which is resonant at the prime frequency with capacitor 253. Resonant operation of the loop causes a greatly increased circulating prime frequency current through the inducer windings resulting in a radiated electromagnetic field of far greater proportions. Such increased resonant current increase is produced in my preferred embodiment by high "Q" operation of the inducer. In my instant invention unusually high "Q" inducer operation is permitted to be usable by an operator of average skill because the prime frequency oscillator is stabilized by a piezeoelectric radio crystal or like means. Such oscillator stabilization is consistent with the requirement for good prime frequency constancy when the inducer "Q" is unusually high thereby resulting in an inducer of particularly narrow accommodation for nominal frequency bandwidth. The centertap of the output loop primary 251 which is bypassed by capacitor 220 is driven by cascaded emitter follower transistors 606, 607 operative as a variable impedance in series with a source of direct current power connected to juncture 609. The base of transistor 606 is driven by a voltage follower amplifier 601, an operational amplifier connected with its output 604 direct tied to the inverting input 603. A capacitor 605 provides operational compensation, while the incoming modulation signal is brought in at juncture 650 to the noninverting input 602 on the amplifier.

Direct current power for portable operation is provided by an electrochemical cell apparatus, or battery 701 in conjunction with disconnect device 702 and bypass capacitor 703, the output juncture 704 is normally connected to power juncture 609 and all other active device power terminals.

FIG. 6 shows my preferred embodiment for a fourteen level converter, period decoder, and divide by "n" circuit. This is an extension of the circuit shown and described for FIG. 3. The circuit shown in FIG. 6 consists of a divide by "n" counter 301 utilized in my model to divide by thirtytwo, resulting in a first frequency of 13,831.25 hertz, if a prime frequency crystal 103 of 442.6 kilohertz is used in the oscillator such as I did in my model. This output 302 serves to drive the two seven bit binary period decoder counters 303 and 320 to provide fourteen binary outputs on lines 304 through 310, and lines 321 through 327 with the output at 304 being ½ the first frequency derived from 302, descending to output 327 which is 1/16,384 of the first frequency on line from 302, or in my model embodiment 0.844 hertz. This results in a subsequent range of lower second frequency pulse trains, or audio tones, from 6915.625 hertz down to 0.844 hertz, with the latter being reproduced as a "tick" rather than a "tone" in my demonstrative demodulator in FIG. 2. The following chart lists the periodicity of the impulses produced by the modeled form of my new invention I herein illustratively describe.

| Impulse | Rate | Output On |
|---------|------|-----------|
| F2A | 6915.625 Hz | 501 |
| F2B | 3457.812 Hz | 502 |
| F2C | 1728.907 Hz | 503 |
| F2D | 864.453 Hz | 504 |
| F2E | 432.227 Hz | 505 |
| F2F | 216.113 Hz | 506 |
| F2G | 108.057 Hz | 507 |
| F2H | 54.028 Hz | 508 |
| F2I | 27.014 Hz | 509 |
| F2J | 13.507 Hz | 510 |
| F2K | 6.754 Hz | 511 |
| F2L | 3.377 Hz | 512 |
| F2M | 1.688 Hz | 513 |
| F2N | 0.844 Hz | 514 |

This listing further serves to clearly show the harmonic relationship between the derived "tones".

In my modeled embodiment in FIG. 6 the outputs 304 through 310, and 321 through 327 are combined in the AND gates 401 through 413, the resulting control signal outputs of which drive buffers 501 through 514, isolation diodes 515 through 528, and summing resistors 529 through 542 producing a composite output as described earlier for FIG. 3 at juncture 550 in FIG. 6 differing only in that 8,192 unique pulse or burst combinations occur before the cycle repeats. Juncture 550 in FIG. 6 drives input juncture 650 in FIG. 5, resulting in frequency dependent amplitude modulation of the prime radio frequency carrier by the plural second pulse train rates at distinctly different amplitudes for each second frequency pulse rate.

Having covered the circuit operation for my preferred embodiment, the purpose for the delay network resistor 110 and capacitor 111 in FIG. 5 can be shown. With all circuits being synchronous in operation the level converter changes can be expected to occur when NO power is being supplied by the prime frequency amplifier 200. This effect serves to eliminate switching transients and spurious signals. To assure such "zero cross" switch action, some delay of the prime frequency path through the amplifier is needed to compensate for the propagation delays through all the logic and amplifying devices involved in the level converter and other second frequency producing circuits. This is on the order of a couple of hundred nanoseconds and can be conveniently provided for with the said delay network.

FIG. 7 shows the relationship of the various signals or impulses occuring in the means described in FIGS. 5 and 6. The prime or radio frequency appearing across the inductor 252 in FIG. 5 is shown as a pattern or burst waveforms 254 in FIG. 7. Each singular burst, in this exampled circuit means, contains 64 cycles of the prime frequency with an equivalent "off" period between bursts. The impulse relationship for producing these bursts is shown where the 13,831.25 hertz first frequency 302A (signal on "E") is shown to produce a plurality of pulse trains on the outputs of buffers 501 through 514 as shown by waveforms 501A through 514A in FIG. 7. What is shown is that when the lowest frequency buffer output 514A occurs, the maximum amplitude burst signal will be produced, while alternatively when only the output from buffer 501A occurs the smallest amplitude burst signal will be delivered. In the particular form of my modeled embodiment, the lowest repetition rate buffer outputs as typified by 514A will have priority over the higher frequency outputs typified by 513A through 501A in a descending recurrence rate order. The result is that the lowest frequency component at any instant will dominate the amplitude of the composite waveform 254 producing a series of prime frequency bursts the amplitudes of which are inversely proportional to the lowest second frequency component. In FIG. 7 waveforms 304A (501A), 305A, 306A, 307A depict the first four of the seven counter bits outputed by divider 303 in FIG. 6. What results is illustrative of how a logic AND functions on 304A, 305A result in output 502A whereas 502A can only be logic (1) when both 304A, 305A are simultaneously (1). In a like manner I show the logic (1) AND combination of 304A, 305A, 306A can produce 503A logic (1). Further extension shows logic (1) AND combination of 304A, 305A, 306A, 307A can produce 504A logic (1). Alternatively logic (1) AND combination of 503A, 307A will also produce output 504A. This demonstrates the novel manner in which I derive single bursts or impulses at a pluality of repetition rates wherein the impulse duration is always about the duration of any single component in the highest second frequency output 501A (or 304A).

My invention is of particular importance as an exciter for use in tracing and tracking apparatus, in particular for the class of equipment used for tracing buried or otherwise hidden structures.

I have hitherto described my invention in terms of a particular form because that form presents most clearly the difficulty my invention improves upon, but it will be understood that my invention is also applicable to other manner of construction.

While my invention has been shown to use particular types of integrated circuit gain and function devices, a person skilled in the art could duplicate the same functions from built up circuits consisting of individual components arranged in a wide variety of combinations, or with other combinations of integrated circuit devices.

While my invention is shown to use a prime frequency oscillator operating at the same frequency as the output frequency from the associated amplifier and inducer, this does not preclude the use of a still higher frequency oscillator with a subsequent divider circuit to produce the said prime frequency.

While my invention shows the use of a particular combination of binary counters and gated period decoders the same result can be attained in other circuit combinations by those skilled in the art.

While my invention shows a particular form of level converter and modulator other combinations providing like results are equally suitable.

While my modeled invention teaches the use of particular prime, first and second frequencies for operation of the individual circuit elements other combinations of appropriately related frequencies may offer equivalent performance.

While my modeled invention shows the use of an inductive loop as the output coupling means, other means such as direct coupling to a parasitic radiator may be employed with similiar results.

The elements comprising my said exciter when properly coupled to each other as shown in FIGS. 5 and 6 form a compact package which can principally be contained upon a printed circuit board or like support means within a protective housing. My model which operates successfully utilizes the following key components and component values:

| | |
|---|---|
| integrated circuit 101,102,201, | 4011AE |
| integrated circuit 202,207,208,401 through 413 | 4081BE |
| integrated circuit 301, 303, 320 | 4024AE |
| integrated circuit 501 through 514 | 1/6 4050AE |
| integrated circuit 601 | CA3030 |
| transistors 211, 212, 607 | 2N3643 |
| transistor 606 | 2N5135 |
| diodes 515 through 528 | 1N270 |
| quartz crystal 103 | 442.6 kilohertz |
| battery 701 | 12 volts |
| resistor 104 | 47,000 ohms |
| resistor 110, 533, 534 | 1,000 ohms |
| resistor 204, 206 | 3,900 ohms |
| resistor 209, 210, 536 | 680 ohms |
| resistor 529, 530 | 1,500 ohms |
| resistor 531, 532 | 1,200 ohms |
| resistor 535 | 820 ohms |
| resistor 537 | 560 ohms |
| resistor 538 | 470 ohms |
| resistor 539 | 330 ohms |
| resistor 540 | 270 ohms |
| resistor 541 | 220 ohms |
| resistor 542 | 3,300 ohms |
| capacitor 111, 203, 206 | 150 picofarad |
| capacitor 220 | 50 nanofarad |
| capacitor 703 | 100 nanofarad |
| capacitor 605 | 56 picofarad |
| capacitor 253, varible | 150 – 250 picofarad |
| loop 250 | consists of primary 251 and secondary 252 resonant with capacitor 253 and 442.6 kilohertz |
| disconnect 702 | S.P.S.T. switch |

The foregoing parameters and values are given by way of example only to assist one of average skill in the art to duplicate my invention and are not intended to limit in any way the scope of my invention.

What I claim is:

1. Frequency dependent amplitude modulated exciter means efficacious to produce a prime frequency electromagnetic signal pattern consisting of an ordered series of prime frequency signal bursts of various instantaneous energy levels the individual amplitudes of which are recurrently controlled by a combination of plural pulse trains, said exciter including in operative combination:

a. oscillator means operative to produce an alternating current prime frequency signal;

b. amplifying means operatively connected to said oscillator means so as to increase the magnitude of said prime frequency signal;

c. output coupling means operatively connected to said amplifying means so as to serve as terminal means for said amplified prime frequency signal;

d. modulation means operatively connected to said amplifying means so as to control the instantaneous level of said prime frequency signal as delivered by said amplifying means to said output coupling means;

e. means operative to produce a source of alternating current first frequency signal;

f. period decoder means connected to said first frequency signal means and operative to develop an ordered pattern of various second pulse trains, including in combination:

fa. binary divider means, a clock control signal for which is provided by said first frequency signal means and operative so as to provide a different binary signal train at each of several outputs;

fb. combinatorial logic means connected to said binary divider means and operative so as to combine said binary signal trains from said divider means into an ordered pattern of second pulse trains, each of a different rate each provided at one, of a pluraltiy of outputs therefrom;

g. level converter means connected to the said period decoder means plural pulse train outputs and operative to produce, at a common summing point, a modulating train comprising a sequence of pulses of different instantaneous voltage amplitudes, each amplitude corresponding, respectively, to a different combination of the plural second pulse trains;

h. connective means between said level converter means and the input to said modulation means;

i. a source of direct current energy, including a disconnect means, so arranged as to provide operating voltage and current to each of the several said operative means comprising the said exciter.

2. The exciter means of claim 1 wherein said prime frequency oscillator means includes a piezeoelectric quartz crystal connected operatively as a frequency controlling feedback element for the purpose of stabilizing the periodicity of said prime frequency signal, said prime frequency oscillator thereby permitting effective use of high "Q" frequency selective output coupling means exhibiting unusually narrow bandwidth.

3. The exciter means of claim 1 wherein said output coupling means includes resonant, high "Q", induction loop means operative to produce an electromagnetic signal field of large proportions for indirect coupling into concealed, unaccessible structure such a pipe or cable.

4. The exciter means of claim 1 wherein said modulation means includes emitter follower transistor circuit means operative as variable impedance means between said amplifying means and said source of direct current energy.

5. The exciter means of claim 1 wherein said level converter means causes said modulating pulse train in which the lowest repetition rate second pulse train produces the highest amplitude output level and each progessively higher repetition rate second pulse train produces a proportionately lower amplitude output level.

6. The exicter means claim 1 wherin said modulating pulse train produces prime frequency signal bursts and furthermore where each said burst, irrespective of ampitude, has a duration somewhat less than the cycle period of the highest said rate of the said various second pulse trains.

7. The exciter means of claim 1 wherein said various second pulse trains being derived from said binary divider means, will be caused to occur at several harmonically related intervals to produce simultaneous audio frequency tones suited for human sensibility.

8. The exciter means of claim 1 wherein said first frequency signal means comprises a further binary divider means coupled to said prime frequency signal, the purpose for which is to permit synchronous operation of said level converter resulting in amplitude level changes effected on said prime frequency by said various second pulse trains to occur when minimum signal is being supplied by said prime frequency amplifying means to said output coupling means.

9. The exciter means of claim 1 wherein said source of D.C. power consists of a battery group, including a disconnect means, said battery group to include optional use of batteries which may be recharged from an external source of prime power, thereby providing for portable operation of said exciter means.

10. The exciter means of claim 3 wherein said exciter means is made in the form of a portable enclosure which serves to support said induction loop means, several said operative means, and said direct current energy source means in operative combination suited for tracing buried or otherwise hidden structures.

11. Frequency dependent amplitude variant exciter means efficacious to produce an ordered signal pattern comprised of signal pulses of various instantaneous energy levels principally controlled at a periodic frequency rate at least equal to the highest frequency component in said signal pattern, said exciter including in operative combination:

a. oscillator means operative to produce a periodic first frequency signal at least equal to the highest frequency component in said ordered signal pattern;

b. period decoder means connected to said oscillator means operative to develop an ordered plurality of second alternating current signal pulses including in combination:

ba. binary divider means a clock control signal for which is provided by said first frequency signal and operative so as to provide a different binary signal train at each of several outputs;

bb. combinatorial logic means connected to said binary divider means so as to combine said binary signal trains from said divider means into an ordered pattern of second pulse trains, each of a different rate, each provided at one of a plurality of outputs therefrom;

c. level converter means coupled to said combinatorial logic means outputs and operative to produce at a summing point, a pulse train comprising a sequence of pulses of different instantaneous voltage amplitudes, each amplitude corresponding, respectively, to a different combination of plural second pulse trains particular said second frequency signal impulse repetition rate combination;

d. output coupling means coupled to said level converter means and operative to produce an output signal at a terminal means which is proportional to the instantaneous voltage amplitudes appearing at said summing point.

12. Exciter means for producing output signal pulses composed of a sequential plurality of distinctly different pulse amplitudes wherin each particular amplitude component has a precisely defined periodicity, said exciter including in operative combination:

a. input means connectable to a source of D.C. voltage for receiving operating current and voltage therefrom;

b. generative means coupled to said input means and operative to develop first frequency oscillations in response to connection to said source of D.C. voltage;

c. counter means coupled to said generative means including a plurality of flip-flops arranged in a binary sequential circuit that includes several outputs therefrom which are caused to proceed cyclically through a set of stable binary states in response to a series of said first frequency oscillations;

d. combinatorial switching network means coupled to said counter means and responsive to said set of stable binary states so as to be concurrently operative to produce a plurality of unique seconds signal pulse rates, exhibiting harmonic relationship, at each of several outputs;

e. level converter means coupled to the said several outputs provided by the said combinatorial switching network means and operative to produce at a common summing point output terminal a pulse train comprising a sequence of pulses of different instantaneous voltage amplitudes wherein each amplitude corresponds, respectively, to a different combination of plural second pulse trains.

* * * * *

UNITED STATES PATENT AND TRADEMARK OFFICE
CERTIFICATE OF CORRECTION

PATENT NO. : 4,137,500
DATED : January 30, 1979
INVENTOR(S) : Harold J. Weber

It is certified that error appears in the above—identified patent and that said Letters Patent are hereby corrected as shown below:

Column 10, line 68, "seconds" should read --- second ---.

Signed and Sealed this

Seventeenth Day of July 1979

[SEAL]

Attest:

Attesting Officer

LUTRELLE F. PARKER
Acting Commissioner of Patents and Trademarks